Sept. 2, 1947.  S. B. HASELTINE  2,426,684
FRICTION SHOCK ABSORBER
Filed Jan. 15, 1944
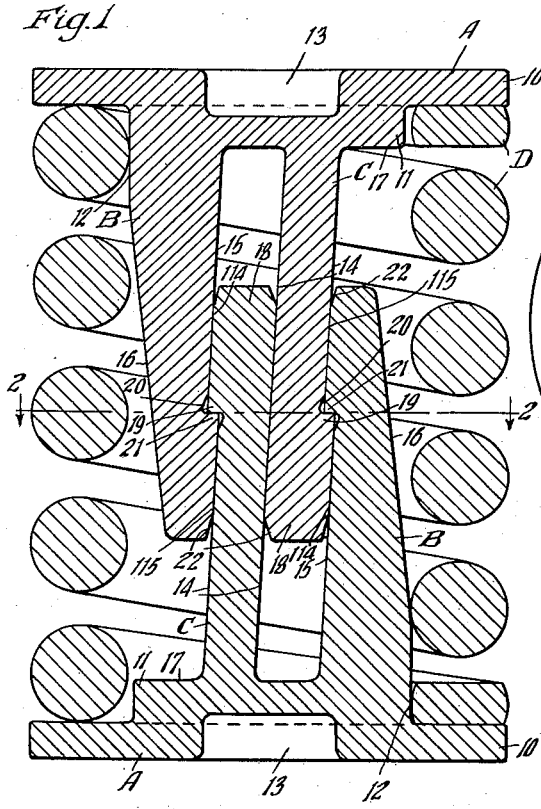
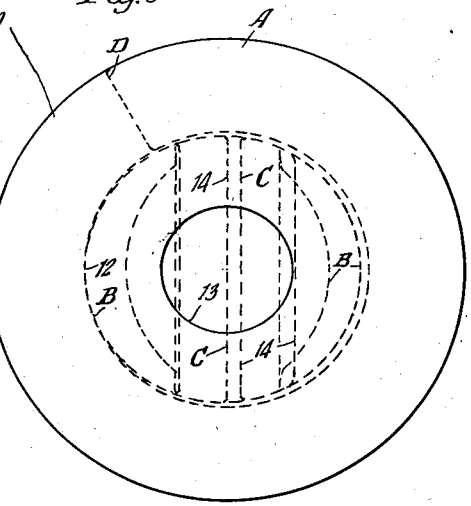
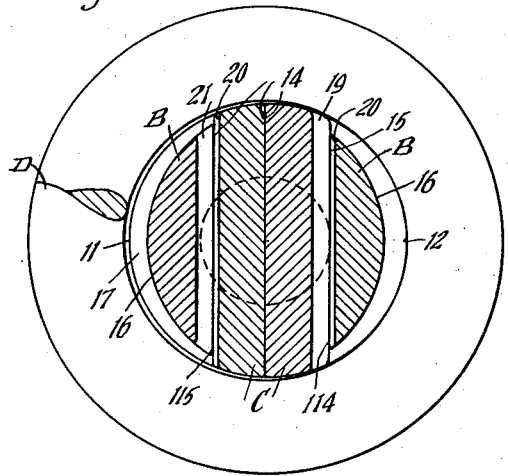
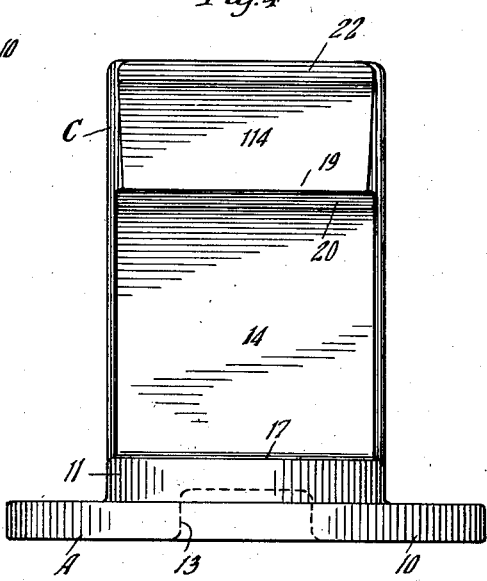
Inventor
Stacy B. Haseltine
By Henry Fucks
Atty.

Patented Sept. 2, 1947

2,426,684

UNITED STATES PATENT OFFICE 2,426,684

FRICTION SHOCK ABSORBER

Stacy B. Haseltine, La Grange, Ill., assignor to W. H. Miner, Inc., Chicago, Ill., a corporation of Delaware Application January 15, 1944, Serial No. 518,345

9 Claims. (Cl. 267—9)

1

This invention relates to improvements in friction shock absorbers, especially adapted for snubbing or dampening the action of truck springs of railway cars.

One object of the invention is to provide a friction shock absorber comprising a plurality of relatively movable friction members having interengaging inclined friction surfaces extending lengthwise thereof, together with spring means opposing relative movement of said members, wherein the spring means also functions to press said members into tight frictional engagement with each other by canting of the spring means due to relative lateral displacement of the friction members as the latter are moved lengthwise with respect to each other.

A more specific object of the invention is to provide a friction shock absorber comprising follower members movable toward and away from each other; inclined friction members projecting from said followers and formed integral therewith; and a coil spring surrounding said friction members and bearing at opposite ends on said followers, wherein the friction members of one follower are intercalated with the friction members of the other follower, whereby when said followers and inclined friction members are moved toward and away from each other each follower and its friction members are displaced laterally with respect to the other follower and its friction members, thereby producing canting of the coil spring which, due to its resistance to being canted, yieldingly forces the friction members into tight frictional engagement with each other.

Other objects of the invention will more clearly appear from the description and claims hereinafter following.

In the drawing forming a part of this specification, Figure 1 is a transverse vertical sectional view of my improved shock absorber, said section being in a plane coincident with the central vertical axis of the mechanism. Figure 2 is a horizontal sectional view, corresponding substantially to the line 2—2 of Figure 1. Figure 3 is a top plan view of Figure 1. Figure 4 is an elevational view of one of the friction elements of the mechanism shown in Figure 1, said view showing the lower friction element, looking from left to right in Figure 1.

My improved shock absorber comprises broadly upper and lower follower A—A; upper and lower sets of friction members, each set comprising two friction members B—C; and a coil spring D surrounding the friction members and bearing at

2 its top and bottom ends on the upper and lower followers, respectively.

The upper and lower followers A—A are identical. Each follower A is in the form of a relatively heavy disc, having a laterally projecting annular flange 10 of lesser thickness than the central portion of the follower disc. The central portion of the follower, which is raised with respect to the flange, is indicated by 11. The raised portion 11 is of circular outline, presenting a vertical outer wall 12, which is substantially cylindrical.

Each follower A is provided with a central opening or seat 13 adapted to receive the usual centering projection of the corresponding spring follower plate of a cluster of truck springs.

The upper and lower friction members B—C and B—C are also identical. Each friction member B and C is in the form of a relatively heavy plate or post, the member B being thicker than the member C. The member C is substantially flat, having longitudinally extending, flat friction surfaces 14—14 on opposite sides thereof.

The member B has a longitudinally extending, flat friction surface 15 on the inner side thereof. The outer side of the member B is rounded, or transversely curved, thus presenting a longitudinally extending, transversely curved surface 16.

The friction members B and C are formed integral with the corresponding follower A, the member B and C of the lower follower A upstanding therefrom and the members of the upper follower depending from the same.

As shown most clearly in Figure 1, the members B and C of each follower A are spaced apart laterally and the member C of the lower follower is accommodated between the members B and C of the upper follower while the member C of the upper follower is accommodated between the members B and C of the lower follower.

As will be evident upon reference to Figures 1, 2, and 3, the two friction elements, comprising on the one hand the lower follower A and the lower friction members B and C, and on the other hand the upper follower A and the upper friction members B and C, are of identical design but reversely arranged, that is, the upper friction element is inverted with respect to the lower element and has the friction member B at the left hand side thereof, while the lower element has the friction member B at the right hand side.

The friction member B of each follower A has the outer surface 16 thereof merging with the wall 12 of the raised portion 11 of the follower, and the friction member C of each follower is laterally inwardly offset with respect to said raised portion 11 of the follower, thereby providing a horizontal ledge 17.

The friction members B and C of each follower A are inclined to the vertical, the members B and C of the upper set being inclined downwardly away from the vertical central axis of the mechanism, and the members B and C of the lower set being inclined upwardly away from said axis.

The friction member C of each follower A is laterally, outwardly thickened at its outer end, as indicated at 18, thereby presenting a friction surface portion 114 which is laterally offset with respect to the surface 14 at the outer side of said member, and a transverse stop shoulder 19 at the inner end of said surface 114.

The member B of each follower is provided with a transverse shoulder 21 on its inner side, similar to the shoulder 19 of the member C, and the friction surface of said member B, outwardly of said shoulder, is offset laterally with respect to the surface 15, said offset surface portion being indicated by 115. To provide the desired clearance to assure engagement of the shoulders 19 and 21 of the members C and B of the two followers A—A with each other, the friction surfaces 15 of the members B and the friction surfaces 14 of the members C are recessed or notched at said shoulders, as indicated at 20.

To facilitate assembly, the members B and C of each follower A have beveled outer end portions, as indicated at 22.

In the assembled condition of the shock absorber, the friction surfaces 14 and 114 at the outer sides of the upper and lower members C have sliding engagement, respectively, with the inner surfaces 115 and 15 of the upper and lower members B, and the friction surfaces 14 on the inner sides of the upper and lower members C have sliding engagement with each other.

The spring D is in the form of a heavy coil, surrounds the friction members B—C and B—C, and has its top and bottom ends bearing on the flanges 10 of the upper and lower followers A and A, respectively. The spring D closely embraces the raised portions 11—11 of the upper and lower followers at diametrically opposite sides, that is, as viewed in Figure 1, the coil at the upper end of the spring has the inner side thereof, at the left hand side of the mechanism, bearing on the vertical wall 12 of the raised portion 11 of the upper follower A, and the coil at the lower end of the spring has the inner side thereof, at the right hand side of the mechanism, bearing on the vertical wall 12 of the raised portion 11 of the lower follower A.

The spring D is preferably under initial compression and in addition to yieldingly opposing relative approach of the followers A—A opposes relative lateral displacement of said follower due to its resistance to being canted.

In assembling the mechanism, the spring D is first placed in position over the lower friction members B and C, resting on the flange 10 of the lower follower A. The upper friction members B and C are then engaged with the lower members, the upper member C being engaged between the lower members B and C with the upper member B alongside the lower member C, as clearly shown in Figure 1. The follower A is then forced downwardly, thereby wedging the upper and lower members C—C between the upper and lower members B—B, spreading the latter apart until the shoulders 19 of the members C pass the shoulders 21 of the members B and snap into engagement with each other. As will be evident, the interengaging shoulders of the members B and C limit separation of the followers A—A and serve to hold the mechanism assembled.

My improved shock absorber preferably replaces one or more of the spring units of a truck spring cluster, being interposed between the usual top and bottom spring plates which cooperate with said cluster, however, several of such shock absorbing units may be employed in a single spring cluster replacing two or more units of the latter.

The operation of the improved shock absorber is as follows: Upon the spring cluster of the truck of a railway car being compressed between the spring follower plates of the cluster, the shock absorbing unit, which is disposed between said follower plates, is compressed therewith, thereby forcing the upper follower A and the upper friction members B—C downwardly toward the lower follower A and lower members B—C against the resistance of the spring D. Due to inclination of the cooperating friction surfaces thereof, the upper and lower friction members are displaced laterally during lengthwise movement of the same, thereby also displacing the followers laterally. Frictional resistance is thus provided between the cooperating friction surfaces of the upper and lower friction members. During this action, as will be evident upon reference to Figure 1, the tendency is to displace the upper follower A toward the left and the lower follower A to the right, thereby causing the followers to slide on the top and bottom spring follower plates of the spring cluster of the railway car truck. Thus, additional frictional resistance is provided to snub the action of the truck springs. This relative lateral displacement of the upper and lower followers is yieldingly opposed by the spring D due to its inherent tendency to resist canting action. Thus, during relative lengthwise movement of the friction members, the required frictional resistance is developed to effectively snub the action of the truck springs. Upon release of the mechanism, the upper and lower friction members B—C and B—C are restored to the normal position shown in Figure 1 by the expansive action of the spring D and its tendency to return to normal straightened condition, longitudinal separation of the friction members being limited by engagement of the shoulders 19 and 21 of the friction members with each other. As will be evident, frictional resistance to snub the truck springs is also had during this releasing action.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with opposed pairs of relatively lengthwise slidable friction members, the members of each pair being spaced apart laterally, one member of each pair being interposed between the members of the other pair and having substantially flat, straight friction surfaces on opposite sides thereof engaging substantially flat, straight friction surfaces on the inner sides of the members of the other pair, all of said surfaces being inclined in the same direction with respect to the longitudinal central axis of the mechanism; of a coil spring surrounding said members and opposing relative lengthwise movement of said opposed pairs toward each other.

2. In a friction shock absorber, the combination with opposed pairs of relatively lengthwise movable friction members, the members of each pair being spaced apart laterally, one member of each pair being interposed between the members of the other pair and having longitudinally extending, straight friction surfaces on opposite sides thereof engaging longitudinally extending, straight friction surfaces on the inner sides of the members of the other pair, all of said surfaces being parallel to each other and inclined to the longitudinal central axis of the mechanism; of end followers integral with said members of each pair, said end followers being disposed at opposite ends of the mechanism; and a coil spring surrounding said members and bearing at opposite ends on said end followers.

3. In a friction shock absorber, the combination with upper and lower follower plates; of a pair of laterally spaced friction members depending from the upper follower plate; a second pair of laterally spaced friction members upstanding from said lower follower plate, one of said members of each pair being engaged between the members of the other pair and having straight, flat, friction surfaces on opposite sides thereof engaging straight flat friction surfaces on the inner sides of the other pair, said friction surfaces extending lengthwise of said members, all of said friction surfaces being parallel to each other and inclined to the vertical in the same direction and a coil spring surrounding said members and bearing at its top and bottom ends on said follower plates.

4. In a friction shock absorber, the combination with upper and lower spring follower plates; of a set of laterally spaced friction members depending from said upper follower plate, said members having parallel, longitudinally extending, straight friction surfaces inclined lengthwise with respect to the central vertical axis of the mechanism; a second set of laterally spaced friction members upstanding from said lower follower plate, said last named members being alternated with said first named members and having longitudinally extending straight friction surfaces parallel to and engaged with the friction surfaces of said first named members; and a coil spring surrounding said members and bearing at its top and bottom ends on said follower plates respectively.

5. In a friction shock absorber, the combination with two sets of relatively lengthwise slidable friction members having interengaging friction surfaces inclined to the longitudinal central axis of the mechanism, said members of each set being integrally connected at their bases; of a coil spring surrounding said sets of members and extending lengthwise thereof; and a side abutment face on the base portion of each set of members, said side abutment faces of said base portions of said two sets of members being respectively at opposite sides of the mechanism and in bearing engagement with the inner sides of the top and bottom end coils respectively of the spring, whereby the opposition of the spring to being canted forces said sets of members laterally toward each other.

6. In a friction shock absorber, the combination with an upper spring follower plate; of a lower spring follower plate; a pair of upper, laterally spaced, inclined friction members depending from said upper plate and integral therewith; a lower friction member upstanding from said lower spring follower plate and integral therewith, said lower friction member being inclined correspondingly to said upper members and being engaged between said upper pair of members, said upper and lower members having longitudinally extending, interengaging friction surfaces; and a coil spring surrounding said members bearing at its top and bottom ends on said upper and lower spring follower plates, said spring having the inner side of the coil at the upper end seated against the outer side of the upper members at the spring follower plate end of the same, and the inner side of the coil at the lower end seated against the opposite outer side of the lower member at the spring follower plate end of the same.

7. In a friction shock absorber, the combination with an upper lengthwise extending friction member inclined to the central longitudinal axis of the mechanism, said member having an integral follower plate portion at its upper end; of a pair of laterally spaced, lower lengthwise extending friction members having a follower plate portion at its lower end integral therewith, said lower members frictionally embracing said upper member on opposite sides; and a coil spring surrounding said friction members and bearing at the top and bottom ends on the follower plate thereof to yieldingly oppose relative approach of said upper and lower friction members.

8. In a friction shock absorber, the combination with a pair of relatively movable followers; of a pair of laterally spaced friction plates integral with one of said followers, said plates being inclined to the longitudinal central axis of the mechanism; a friction plate member projecting from the other follower and integral therewith, said plate member being engaged between said spaced friction plates and correspondingly inclined thereto; and a spring surrounding said plates and bearing at its opposite ends on said followers.

9. In a friction shock absorber, the combination with opposed pairs of relatively lengthwise slidable friction members having shouldered engagement with each other to limit lengthwise separation thereof; of end followers integral with said pairs of members respectively; and a spring surrounding said members and bearing at its opposite ends on said end followers.

STACY B. HASELTINE.

REFERENCES CITED

The following references are of record in the file of this patent:

UNITED STATES PATENTS

| Number | Name | Date |
| --- | --- | --- |
| 1,127,657 | McCormick | Feb. 9, 1915 |
| 2,042,647 | Wine | June 2, 1936 |
| 2,162,342 | Anderson | June 13, 1939 |
| 207,020 | Dick et al. | Aug. 13, 1878 |
| 754,942 | Thornburg | Mar. 15, 1904 |
| 709,999 | McCord | Sept. 30, 1902 |
| 1,694,987 | Sherman et al. | Dec. 11, 1928 |
| 1,938,715 | Miner | Dec. 12, 1933 |
| 2,223,656 | Bachman | Dec. 3, 1940 |